US011886823B2

(12) United States Patent
Ciano et al.

(10) Patent No.: US 11,886,823 B2
(45) Date of Patent: Jan. 30, 2024

(54) DYNAMICALLY CONSTRUCTING AND CONFIGURING A CONVERSATIONAL AGENT LEARNING MODEL

(71) Applicant: International Business Machines Corporation, Armonk, NY (US)

(72) Inventors: Giuseppe Ciano, Rome (IT); Pietro Marella, Rome (IT); Leonardo Modeo, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1483 days.

(21) Appl. No.: 15/886,686

(22) Filed: Feb. 1, 2018

(65) Prior Publication Data
US 2019/0238487 A1 Aug. 1, 2019

(51) Int. Cl.
*H04L 51/00* (2022.01)
*G06F 40/35* (2020.01)
(Continued)

(52) U.S. Cl.
CPC ............ *G06F 40/35* (2020.01); *G06F 40/216* (2020.01); *G06F 40/30* (2020.01); *G06F 40/56* (2020.01);
(Continued)

(58) Field of Classification Search
CPC ..... H04L 51/02; H04L 51/216; G06F 40/216; G06F 40/30; G06F 40/35; G06F 40/56;
(Continued)

(56) References Cited

U.S. PATENT DOCUMENTS 8,504,908 B2 8/2013 Chisholm
8,762,302 B1 * 6/2014 Spivack ................. G06Q 50/01
706/12
(Continued)

FOREIGN PATENT DOCUMENTS

CN 101010934 A 8/2007
CN 102314440 A 1/2012
(Continued)

OTHER PUBLICATIONS

Cui, Wanyun, et al., "KBQA: learning question answering over QA corpora and knowledge bases," 2017, Proceedings of the VLDB Endowment 10.5 : 565-576. (Year: 2017).*
(Continued)

*Primary Examiner* — Douglas Godbold
*Assistant Examiner* — Parker Mayfield
(74) *Attorney, Agent, or Firm* — The Steadman Law Firm PLLC

(57) ABSTRACT

An approach is described with respect to dynamically constructing and configuring a conversational agent learning model. Various aspects of the conversational agent learning model may be constructed and updated without continuous intervention of a domain administrator. A method pertaining to such approach may include retrieving a corpus of information. The corpus of information may include records from a set of repositories and external data, including data from social networks or applications. The method further may include configuring the conversational agent learning model based upon the retrieved corpus of information. The method further may include deploying the conversational agent learning model by facilitating interaction between the conversational agent learning model and a plurality of clients. The method further may include updating the conversational
(Continued)

agent learning model to address any modification to the corpus of information.

25 Claims, 9 Drawing Sheets

(51) Int. Cl.
    *H04L 51/02*       (2022.01)
    *G06N 5/02*        (2023.01)
    *G06N 20/00*       (2019.01)
    *G06F 40/30*       (2020.01)
    *G06F 40/56*       (2020.01)
    *G06F 40/216*      (2020.01)

(52) U.S. Cl.
    CPC .............. *G06N 5/02* (2013.01); *G06N 20/00* (2019.01); *H04L 51/02* (2013.01)

(58) Field of Classification Search
    CPC .......... G06N 5/02; G06N 20/00; G06N 3/006; G10L 15/22; G10L 15/063
    See application file for complete search history.

(56) References Cited

U.S. PATENT DOCUMENTS

| | | | | |
|---|---|---|---|---|
| 9,330,659 | B2* | 5/2016 | Ju | G10L 15/22 |
| 9,547,471 | B2* | 1/2017 | Williams | G06F 40/35 |
| 10,319,378 | B2 | 6/2019 | Ichimura | |
| 10,331,312 | B2 | 6/2019 | Napolitano et al. | |
| 2005/0105712 | A1 | 5/2005 | Williams et al. | |
| 2005/0197825 | A1* | 9/2005 | Hagerman | G06F 40/58 |
| | | | | 704/2 |
| 2007/0168480 | A1 | 7/2007 | Biggs et al. | |
| 2009/0228264 | A1 | 9/2009 | Williams et al. | |
| 2011/0078105 | A1 | 3/2011 | Wallace | |
| 2013/0282417 | A1 | 10/2013 | Gaedcke et al. | |
| 2015/0066479 | A1* | 3/2015 | Pasupalak | G06F 16/90332 |
| | | | | 704/9 |
| 2015/0142704 | A1* | 5/2015 | London | G06Q 10/10 |
| | | | | 706/11 |
| 2016/0094492 | A1 | 3/2016 | Li et al. | |
| 2016/0352658 | A1 | 12/2016 | Capper et al. | |
| 2017/0048170 | A1 | 2/2017 | Smullen et al. | |
| 2017/0180276 | A1 | 6/2017 | Gershony et al. | |
| 2017/0345105 | A1* | 11/2017 | Isaacson | G06Q 20/40 |
| 2019/0050708 | A1 | 2/2019 | Miyajima | |

FOREIGN PATENT DOCUMENTS

| | | | | |
|---|---|---|---|---|
| CN | 106055623 | A | 10/2016 | |
| CN | 106294418 | A | 1/2017 | |
| CN | 106844333 | A | 6/2017 | |
| CN | 106997375 | A | 8/2017 | |
| EP | 2879062 | A2 * | 6/2015 | .......... G06F 17/279 |
| JP | 2010079574 | A | 4/2010 | |
| JP | 2011501847 | A | 1/2011 | |
| JP | 2016012197 | A | 1/2016 | |
| JP | 2017215971 | A | 12/2017 | |
| JP | 2019518292 | A | 6/2019 | |
| WO | WO-0246959 | A2 * | 6/2002 | .......... G06F 16/957 |
| WO | WO-02069320 | A2 * | 9/2002 | ............ G06Q 30/02 |
| WO | 2009050521 | A2 | 4/2009 | |
| WO | WO-2011088053 | A2 * | 7/2011 | ............ B60K 35/00 |
| WO | 2017180286 | A1 | 10/2017 | |
| WO | 2017163515 | A1 | 1/2019 | |

OTHER PUBLICATIONS

Desmond M, Guo HL, Heath FF, Bao S, Khabiri E, Krasikov S, Modani N, Nagar S, Ohno M, Srinivasan H, Takeuchi H. A social analytics platform for smarter commerce solutions. IBM Journal of Research and Development. Nov. 21, 2014;58(5/6):10-1. (Year: 2014).*
PCT International Search Report, dated May 14, 2019. [9 pages].
IBM Cloud Docs / Conversation. IBM Cloud Docs, Jan. 26, 2018. [4 pages] <https://console.bluemix.net/docs/services/conversation/index.html#about>.
Saito, Takayoshi. Japanese Patent Application No. 2020-538061: Notice of Reasons for Refusal, dated Aug. 25, 2022. [4 pages].
Saito, Takayoshi. Japanese Patent Application No. 2020-538061: Decision to Grant a Patent, dated Mar. 15, 2023. [2 pages].
Meaning of trend in English. Cambridge English Dictionary. Accessed Mar. 17, 2023. [8 printed pages] <https://dictionary.cambridge.org/us/dictionary/english/trend>.
Meaning of recurrent in English. Cambridge English Dictionary. Accessed Mar. 17, 2023. [4 printed pages] <https://dictionary.cambridge.org/us/dictionary/english/recurrent>.
Meaning of standardize in English. Cambridge English Dictionary. Accessed Mar. 17, 2023. [6 printed pages] <https://dictionary.cambridge.org/us/dictionary/english/standardize>.
Zhao, Xin. Chinese Patent Application No. 201980007480.5: Notification of the First Office Action. China National Intellectual Property Administration, dated Apr. 29, 2023. [23 pages total: 11 pages translated, 12 pages original text].

* cited by examiner

DYNAMICALLY CONSTRUCTING AND CONFIGURING A CONVERSATIONAL AGENT LEARNING MODEL

BACKGROUND

The various embodiments described herein generally relate to a conversational agent learning model (e.g., a bot model, a chatbot model, or a conversational model). More specifically, the various embodiments describe techniques of dynamically constructing and configuring a conversational agent learning model.

Cognitive computing techniques are employed ever more often for purposes of facilitating client interaction. A knowledge base that underpins the problem domain aspects of a cognitive computing model conventionally is static in nature and requires constant monitoring and intervention by an administrator. Furthermore, deficiencies with respect to the cognitive computing model conventionally necessitate direct human intervention.

SUMMARY

The various embodiments described herein provide techniques of constructing and configuring a conversational agent learning model dynamically. An associated method may include retrieving a corpus of information. The corpus of information may include records from a set of repositories and external data, including data from social networks or applications. The method further may include configuring the conversational agent learning model based upon the retrieved corpus of information. The method further may include deploying the conversational agent learning model by facilitating interaction between the conversational agent learning model and a plurality of clients. The method further may include updating the conversational agent learning model to address any modification to the corpus of information.

According to an embodiment, the method further may include, based upon information received consequent to the interaction between the conversational agent learning model and the plurality of clients, identifying at least one deficiency in the conversational agent learning model and updating the conversational agent learning model to address the at least one deficiency. In an additional embodiment, the method further may include receiving input from a domain administrator to refine the interaction between the conversational agent learning model and the plurality of clients. In a further embodiment, the step of updating the conversational agent learning model to address any modification to the corpus of information may include dynamically adjusting at least one aspect of the conversational agent learning model based upon new social trends. In a further embodiment, the step of updating the conversational agent learning model to address any modification to the corpus of information may include dynamically adjusting at least one aspect of the conversational agent learning model based upon introduction of new technology.

According to an embodiment, the step of retrieving the corpus of information may include identifying a plurality of issues and identifying a plurality of solutions respectively corresponding to the plurality of issues. The step of retrieving the corpus of information further may include identifying client content associated with the plurality of issues or the plurality of solutions and identifying any rankings associated with the plurality of solutions. In a further embodiment, the step of configuring the conversational agent learning model may include deriving a plurality of intents based upon the plurality of issues. Each of the plurality of intents may indicate a purpose or a goal. The step of configuring the conversational agent learning model further may include deriving a plurality of entities. Each of the plurality of entities may be an object class or a data type that enables selection of at least one action based upon the plurality of solutions in order to address one or more of the plurality of intents. The step of configuring the conversational agent learning model further may include determining a plurality of dialog portions. Each of the plurality of dialog portions may include conversational text to address one or more of the plurality of intents consequent to applying the at least one action to one or more of the plurality of entities. In a further embodiment, the step of updating the conversational agent learning model to address the at least one deficiency may include incorporating at least one new intent into the plurality of intents or incorporating at least one new entity into the plurality of entities.

According to a further embodiment, the step of deploying the conversational agent learning model may include initializing at least one model instance. The at least one model instance may include at least one conversational interface accessible to at least one of the plurality of clients. The step of deploying the conversational agent learning model further may include classifying conversation content received via the at least one conversational interface, including at least one intent derived from the conversation content and at least one entity derived from the conversation content, based upon aspects of the conversational agent learning model. The step of deploying the conversational agent learning model further may include determining conversation output including at least one dialog portion among the plurality of dialog portions based upon the classification of the conversation content. In a further embodiment, the conversation output may include unstructured dialog. In a further embodiment, the step of deploying the conversational agent learning model further may include, responsive to at least one modification to the conversation content, updating the at least one intent derived from the conversation content, and updating the at least one dialog portion based upon the updated at least one intent.

According to a further embodiment, the conversation output may include conversational text to address the at least one intent derived from the conversation content by applying at least one action to the at least one entity derived from the conversation content. In a further embodiment, the step of classifying the conversation content may include associating the at least one intent derived from the conversation content with at least one intent among the plurality of intents, and associating the at least one entity derived from the conversation content with at least one entity among the plurality of entities. In a further embodiment, the step of classifying the conversation content may include, responsive to determining that the conversation content includes unstructured content, applying at least one recognition technique to the unstructured content to produce a unified text-based artifact, and completing a semantic analysis of the unified text-based artifact via an artificial intelligence computing system to classify the unstructured content.

According to a further embodiment, the step of configuring the conversational agent learning model may include, responsive to determining that the corpus of information includes unstructured content, applying at least one recognition technique to the unstructured content to produce a unified text-based artifact, completing a semantic analysis of the unified text-based artifact via an artificial intelligence computing system to classify the unstructured content, and updating the conversational agent learning model based upon the classification of the unstructured content.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1A:
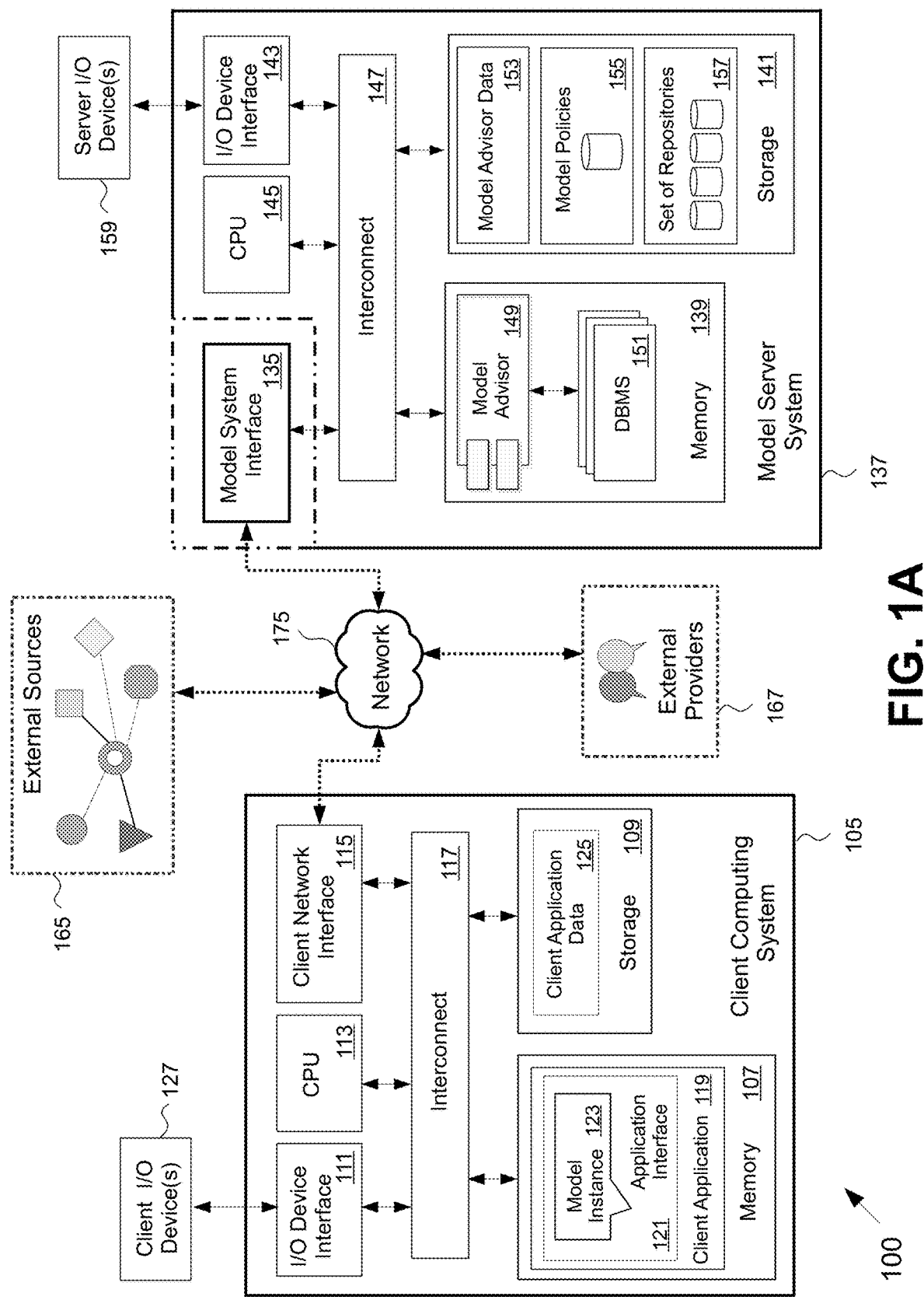
FIG. 1A illustrates a computing infrastructure depicting a client-server configuration with respect to a conversational agent learning model, according to an embodiment.

The various embodiments described herein describe techniques of dynamically constructing and configuring a conversational agent learning model. According to the various embodiments, various aspects of the conversational agent learning model may be constructed and updated without continuous intervention of a domain administrator. A domain administrator may refine aspects of the conversational agent learning model as appropriate.

The various embodiments described herein may have advantages over conventional techniques. Specifically, by autonomously retrieving a corpus of information that underpins the problem domain aspects of a conversational agent learning model, the various embodiments enable dynamic and autonomous configuration and update of such a model. Furthermore, the corpus of information retrieved to configure the conversational agent learning model in accordance with the various embodiments may incorporate multiple information sources. Such information sources may include a set of repositories, which may include knowledge base and analytical information, as well as external data sources, which may include social networking data. Additionally, the conversational interaction between a plurality of clients and respective instances of the conversational agent learning model in accordance with the various embodiments may include unstructured content (e.g., audiovisual aspects) as well as structured textual content. Furthermore, since the incorporated information sources may include data specific to each of a plurality of clients, the conversational agent learning model in accordance with the various embodiments may exploit the client-specific information in order to tailor model aspects to client needs. Increased automation and increased ability to customize aspects of the conversational agent learning model in accordance with the various embodiments may result in increased client satisfaction and an improved customer relationship management process relative to conventional cognitive models. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques of constructing and configuring a conversational agent learning model. However, it should be understood that the techniques described herein may be adapted to a variety of purposes in addition to those specifically described herein. Accordingly, references to specific embodiments are included to be illustrative and not limiting.

FIG. 1A illustrates a computing infrastructure 100, according to an embodiment. As shown, computing infrastructure 100 includes client computing system 105, model system interface 135, model server system 137, external sources 165 (e.g., social networks and/or social applications), and external service providers 167 (e.g., providers of external chatbot services in the form of software as a service), each of which may be connected to a communications network 175. Although client computing system 105 and model server system 137 are illustrated in FIG. 1A, computing infrastructure 100 may include any number of computing systems and more specifically may include any number of client systems and/or server systems.

Illustratively, client computing system 105 may include a memory 107, storage 109, client input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online or network application configured for interfacing with model server system 137 and other computing systems. Client application 119 may include an application interface 121. Application interface 121 may include a model instance 123 (e.g., a conversational agent instance, a bot instance, or a chatbot instance) for interacting with one or more other aspects of a conversational agent learning model constructed and configured via model server system 137. Model instance 123 may include a graphical user interface (GUI) having various elements to facilitate interaction between a client and the conversational agent learning model, e.g., text boxes, radio buttons, drop down menus, etc. Additionally or alternatively, model instance 123 may include a command line interface to facilitate interaction between the client and the conversational agent learning model. Storage 109 may include client application data 125 associated with client application 119. Client application data 125 may include information with regard to any interaction between the client and model instance 123. Client I/O device interface 111 may be communicatively coupled to one or more client I/O devices 127. CPU 113 is included in FIG. 1A to be representative of a single CPU, multiple CPUs, a single CPU having multiple processing cores, or the like. Client network interface 115 may receive data from, and may transmit data to, model server system 137 via network 175. Client computing system 105 may be configured to interface with other server systems in computing infrastructure 100 and/or may be configured to interface with server systems external to computing infrastructure 100.

Model system interface 135 may function as a service manager or a control desk manager with respect to client computing system 105, as well as any other computing systems interfacing with model server system 137. Model system interface 135 may facilitate communication to and from model server system 137 via network 175. Specifically, model system interface 135 may receive data from, and may transmit data to, client computing system 105 via network 175. According to one embodiment, model system interface 135 may be a computing system separate from model server system 137, including a separate processor, memory, and/or storage. Alternatively, model system interface 135 may be a constituent component (e.g., a software application and/or a hardware entity) of model server system 137.

Model server system 137 may include a memory 139, storage 141, server I/O device interface 143, and a CPU 145, all of which may be interconnected via interconnect 147 (e.g., a bus). Although shown as a single computing system, model server system 137 is included to be representative of a single server system or multiple server systems. Model server system 137 may be an automated service management system. Memory 139 may include a model advisor 149 and a database management system (DBMS) 151. As further described herein, model advisor 149 may be an application for constructing and configuring the conversational agent learning model in accordance with the various embodiments described herein. DBMS 151 is included be representative of a single database management system or multiple database management systems. Storage 141 may include model advisor data 153, model policies 155, and a set of repositories 157. Model advisor 149 may generate and process model advisor data 153 based upon interaction with client computing system 105 and/or other computing systems. Model advisor data 153 may include a plurality of model services, which may include "on-premise" chatbot services. Model advisor data 153 further may include one or more references to external model services offered through external service providers 167. Model advisor data 153 further may include information with respect to such external model services. Such external model services may be in the form of software as a service. Model advisor 149 may send to DBMS 151 a database query request (e.g., a query received from client computing system 105), and DBMS 151 may process such query, e.g., based upon data in the set of repositories 157. DBMS 151 may include a software application configured to manage the set of repositories 157.

The set of repositories 157 may include one or more relational databases. Additionally, the set of repositories 157 may include one or more ontology trees or other ontological structures. While FIG. 1A illustrates four repositories among the set of repositories 157, computing infrastructure 100 may include any number of repositories. According to an embodiment, DBMS 151 may send one or more requests to remote databases (not shown) via network 175. Server I/O device interface 143 may be communicatively coupled to one or more server I/O devices 159. CPU 145 is included in FIG. 1A to be representative of a single CPU, multiple CPUs, a single CPU having multiple processing cores, and the like. Model advisor 149 may accept requests sent by client computing system 105 to model server system 137, and further may transmit data to client computing system 105, via model system interface 135. External sources 165 and/or external service providers 167 may transmit external data to, or may otherwise communicate with, model advisor 149 via model system interface 135.

In an embodiment, one or more functions related to constructing and configuring the conversational agent learning model may be executed externally to model server system 137. According to such embodiment, model advisor 149 may communicate with applications external to model server system 137 in order to obtain information or results related to model configuration. Furthermore, according to such embodiment, a database management system and one or more databases external to model server system 137 may provide to model advisor 149 or other components of model server system 137 information or capabilities necessary for model configuration.

Figure 1B:
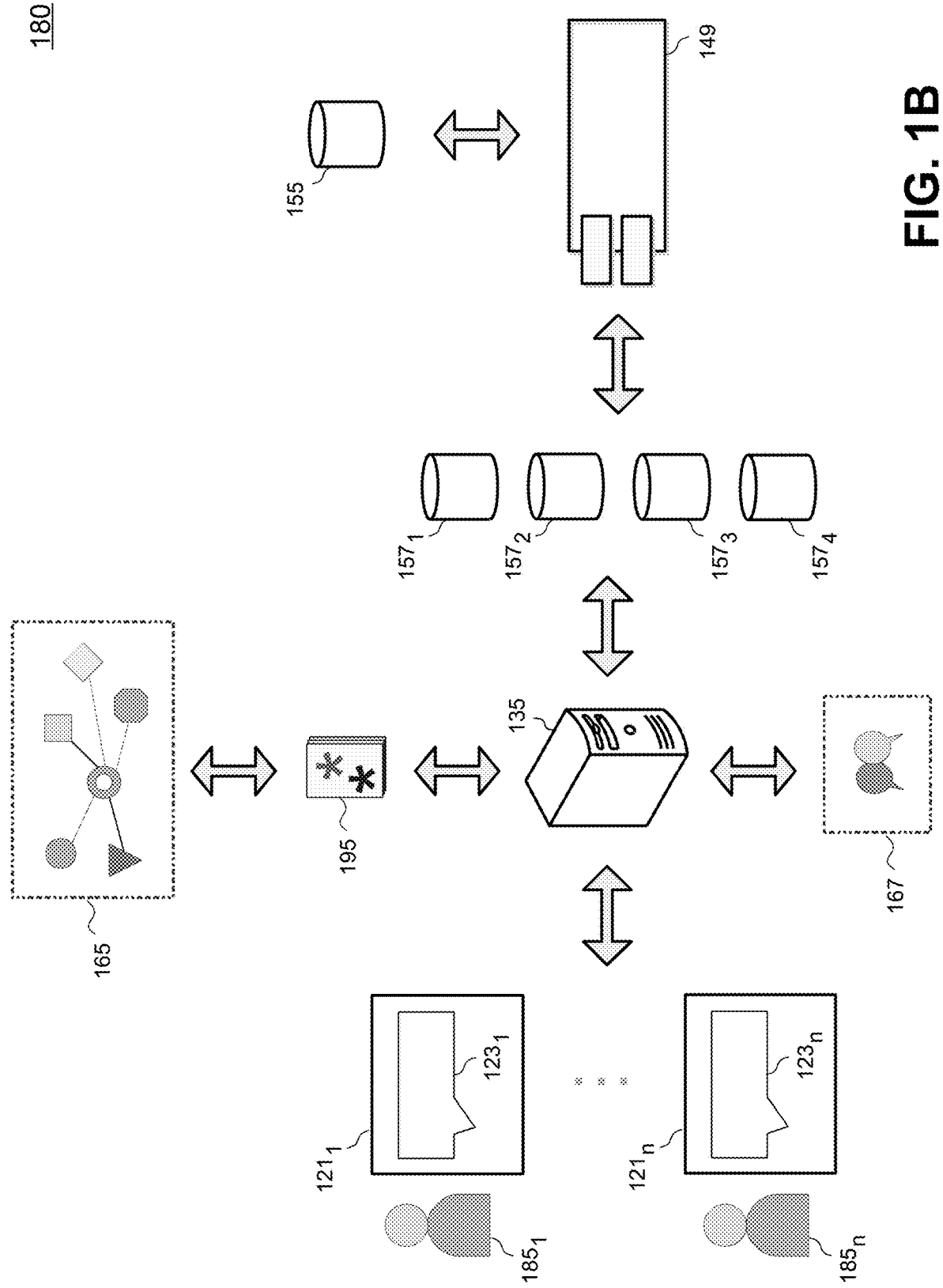
FIG. 1B illustrates a schematic diagram with respect to a conversational agent learning model, according to an embodiment.

FIG. 1B illustrates a schematic diagram 180 with respect to a conversational agent learning model, according to an embodiment. As shown, clients $185_1$ to $185_n$ may interact with model instances $123_1$ to $123_n$ via application interfaces $121_1$ to $121_n$ presented via respective client applications at respective client computing systems. Model advisor 149 may interact with clients $185_1$ to $185_n$ via model instances $123_1$ to $123_n$ by receiving data from and transmitting data to model system interface 135. Accordingly, model system interface 135 may facilitate communication between clients $185_1$ to $185_n$ and model advisor 149. Furthermore, model advisor 149 may obtain external data from, or otherwise communicate with, external sources 165 via model system interface 135. Specifically, model advisor 149 may obtain such external data via plug-ins 195, which may facilitate data extraction from external sources 165. For instance, one or more of plug-ins 195 may facilitate extraction of user content (e.g., user comments, photos, etc.) from a social network or social application such that the content may be transmitted to model advisor 149 for analysis and/or processing. Additionally, model advisor 149 may communicate with external model services 167 via model system interface 135. According to an alternative embodiment, model advisor 149 may obtain external data from external sources 165 and/or external model services 167 directly.

Furthermore, as shown in FIG. 1B, model system interface 135 may facilitate communication between clients $185_1$ to $185_n$ and the set of repositories 157. In addition, model advisor 149 may communicate with one or more of the set of repositories 157. Specifically, repository $157_1$ may be a client data repository that includes data associated with one or more of clients $185_1$ to $185_n$, such as past client input, comments, etc. Repository $157_2$ may be a knowledge base repository including knowledge base(s). Such knowledge base(s) may include records of various solutions corresponding to respective issues (e.g., client inquiries, problems, and/or tasks, which may be received from one or more client computing systems via one or more of model instances $123_1$ to $123_n$). Such knowledge base(s) further may include analytical information based upon one or more aspects of interaction between the conversational agent learning model and one or more of clients $185_1$ to $185_n$ as well as analytical information pertaining to general aspects of the conversational agent learning model, including repository data, external data, and client information (e.g., service desk analytics). Additionally, model advisor 149 may consult such knowledge base(s) during the process of selecting at least one model service in response to a client service request. Repository $157_3$ may be an incidents/modifications repository, which may include database(s) of incidents and modifications. The database(s) of incidents and modifications may include records of all outstanding issues and/or resolved issues. Repository $157_4$ may be a log repository including one or more logs. The one or more logs respectively may include records of tracked exchanges of information between one or more clients $185_1$ to $185_n$ and model server system 137. Repositories $157_1$ to $157_4$ among the set of repositories 157 are merely examples. In alternative embodiments, the set of repositories 157 may include a subset of repositories $157_1$ to $157_4$ and/or additional repositories.

Furthermore, as shown in FIG. 1B, model advisor 149 may consult and/or may update model policies 155. Model policies 155 may include a set of rules indicating how and/or when to update one or more of model instances $123_1$ to $123_n$ or other aspects of the conversational agent learning model, such as contents within the set of repositories 157. In an embodiment, model policies 155 may include one or more rules dictating one or more periodic update policies with respect to one or more model aspects. Such one or more periodic update policies may direct an update of one or more model aspects at one or more specified periodic time intervals. Additionally or alternatively, such one or more periodic update policies may direct an update of one or more model aspects based upon changes to knowledge base(s) and/or based upon analytical information (e.g., service desk analytics). In a further embodiment, model policies 155 may include one or more rules dictating one or more administrative update policies. Such one or more administrative update policies may direct an update of one or more model aspects at the discretion of a domain administrator associated with the conversational agent learning model.

Model advisor 149, model system interface 135, model policies 155, the set of repositories 157, and model instances $123_1$ to $123_n$ may constitute key components of a conversational agent learning model in accordance with the various embodiments described herein. Schematic diagram 180 as shown in FIG. 1B depicts an example configuration of model components. Alternative configurations of model components are intended to fall within the protected scope of the various embodiments.

Figure 2:
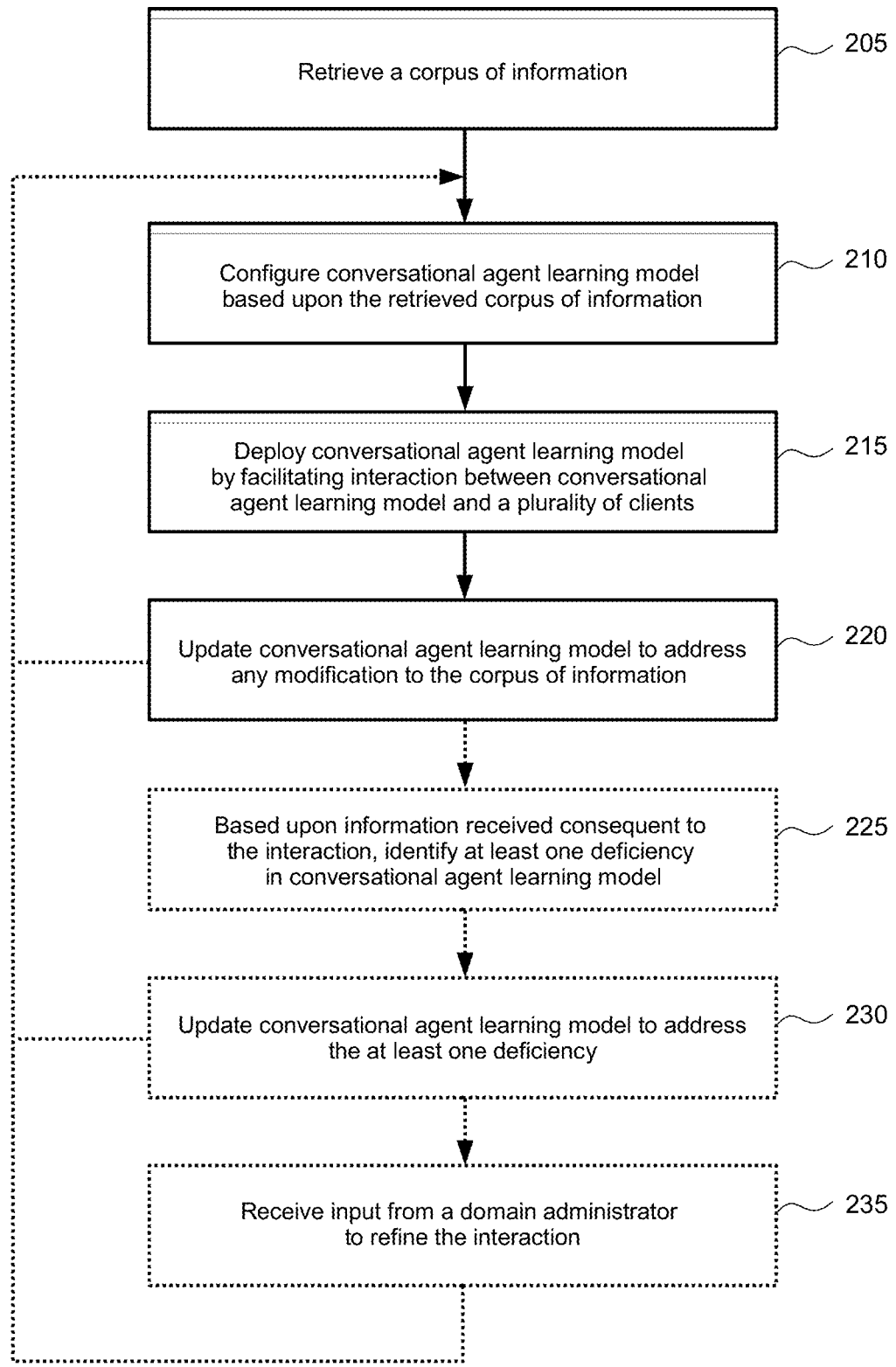
FIG. 2 illustrates a method of constructing a conversational agent learning model, according to an embodiment.

FIG. 2 illustrates a method 200 of constructing a conversational agent learning model. One or more steps associated with the method 200 and the other methods described herein may be carried out in a client-server computing environment (e.g., computing infrastructure 100). Additionally or alternatively, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system.

A model advisor of a server system (e.g., model advisor 149 of model server system 137) may facilitate processing according to the method 200. The method 200 may begin at step 205, where the model advisor may retrieve a corpus of information. The corpus of information may include records from a set of repositories (e.g., set of repositories 157) and external data, including data from social networks or applications (e.g., from external sources 165). In an embodiment, the set of repositories may include a client data repository (e.g., repository $157_1$), a knowledge base repository (e.g., repository $157_2$), an incidents/modifications repository (e.g., repository $157_3$), and/or a log repository (e.g., repository $157_4$). One or more aspects of the corpus of information may be stored or referenced within data associated with the model advisor (e.g., model advisor data 153). An embodiment with regard to retrieving the corpus of information according to step 205 is described with respect to FIG. 3.

At step 210, the model advisor may configure the conversational agent learning model based upon the retrieved corpus of information. According to step 210, the model advisor may populate the conversational agent learning model with aspects based upon the corpus of information retrieved at step 205. In an embodiment, the model advisor may populate the model by adding aspects based upon the corpus of information to the data associated with the model advisor. Additionally, such model advisor data may be updated based upon update(s) to the corpus of information and/or based upon further model configuration. An embodiment with regard to configuring the conversational agent learning model according to step 210 is described with respect to FIG. 4. A further embodiment with regard to configuring the conversational agent learning model according to step 210 is described with respect to FIG. 8.

At step 215, the model advisor may deploy the conversational agent learning model by facilitating interaction between the conversational agent learning model and a plurality of clients (e.g., clients $185_1$ to $185_n$). The model advisor may facilitate interaction according to step 215 via a model system interface (e.g., model system interface 135). The model system interface may be a service manager or a control desk manager. As previously mentioned, the model advisor, the model system interface, model policies (e.g., model policies 155), the set of repositories, and model instances (e.g., model instances $123_1$ to $123_n$) may constitute key components of the conversational agent learning model in accordance with the various embodiments described herein. An embodiment with regard to deploying the conversational agent learning model according to step 215 is described with respect to FIG. 5.

At step 220, the model advisor may update the conversational agent learning model to address any modification to the corpus of information. The model advisor may update the model to address one modification or a plurality of modifications at step 220. The one or more modifications addressed at step 220 may include changes, additions, and/or deletions. In an embodiment, the model advisor may update the conversational agent learning model to address any modification to the corpus of information by dynamically adjusting at least one aspect of the conversational agent learning model based upon new social trends. For instance, new social trends may be manifested via audiovisual media or via social media. By integrating the conversational agent learning model with social media or by otherwise accessing social networks or applications (e.g., by communicating with external sources 165), the model advisor may dynamically adjust the model based upon new social/cultural tastes. Specifically, the model advisor may adjust dialog portions presented in a model instance to a client among the plurality of clients based upon one or more language trends, one or more cultural trends, and/or one or more behavioral trends manifested in social networks or social applications. For instance, upon determining that Client A is a teenager, the model advisor may present to Client A dialog portions consistent with teenage speech, e.g., "That is cool." Accordingly, the model advisor may increase client familiarity and comfort in the context of model interaction.

According to further embodiments, the model advisor may update the conversational agent learning model based upon technological advancement. In one such embodiment, the model advisor may update the conversational agent learning model to address any modification to the corpus of information by dynamically adjusting at least one aspect of the conversational agent learning model based upon introduction of new technology. For instance, based upon introduction of cryptocurrency (e.g., Bitcoin) into world markets, to address a bill payment task or issue, the conversational agent learning model may present to Client B within a model instance dialog portions which facilitate payment via cryptocurrency in addition to more conventional payment methods and/or dialog portions which address questions regarding cryptocurrency. Accordingly, through the model instance Client B may have an option to pay a bill via cryptocurrency. In another such embodiment, the model advisor may update the conversational agent learning model to address any modification to the corpus of information by dynamically adjusting at least one aspect of the conversational agent learning model based upon an improvement to existing technology. According to a further embodiment, the method 200 optionally may return to step 210 so that the model advisor re-configure and re-deploy the model based upon the update of the conversational agent learning model at step 220.

Optionally, at step 225 the model advisor, based upon information received consequent to the interaction between the conversational agent learning model and the plurality of clients, may identify at least one deficiency in the conversational agent learning model. Such information received consequent to the interaction may include conversation content and/or general information associated with one or more of the plurality of clients. Deficiencies in the conventional agent learning model may include, e.g., subject matter not previously encountered and/or subject matter for which there is relatively little or no information to track or access in the context of the model. The model advisor may identify such deficiencies via the interaction between the conversational agent learning model and the plurality of clients. Optionally at step 230 the model advisor may update the conversational agent learning model to address the at least one deficiency. The model advisor may add new information to existing categories within the model structure. Additionally or alternatively, the model advisor may determine one or more new categories and may embed such new categories into the model structure. The model advisor may embed such new categories autonomously, i.e., without intervention from a domain administrator. The model advisor may determine such one or more new categories by searching the set of repositories as well as external data and applying one or more machine learning techniques to newly uncovered information. In an embodiment, the method 200 optionally may return to step 210 so that the model advisor re-configure and re-deploy the model based upon the update of the conversational agent learning model at step 230.

While configuration and deployment of the conversational agent learning model may be primarily dynamic and autonomous (i.e., not requiring human intervention), optionally at step 235 the model advisor may receive input from a domain administrator (e.g., a domain expert) to refine the interaction between the conversational agent learning model and the plurality of clients. Accordingly, such domain administrator may refine end-user experience with respect to one or more of the model instances initialized at one or more of the plurality of clients. Additionally or alternatively, such domain administrator may add or update categories within the model structure. Additionally or alternatively, such domain administrator may facilitate access to new sources for purposes of populating the model. In an embodiment, the method 200 optionally may return to step 210 so that the model advisor re-configure and re-deploy the model based upon refinement of the conversational agent learning model at step 235. In a further embodiment, the model advisor may execute optional step 235 prior to step 220 and/or prior to optional steps 225 and 230.

Figure 3:
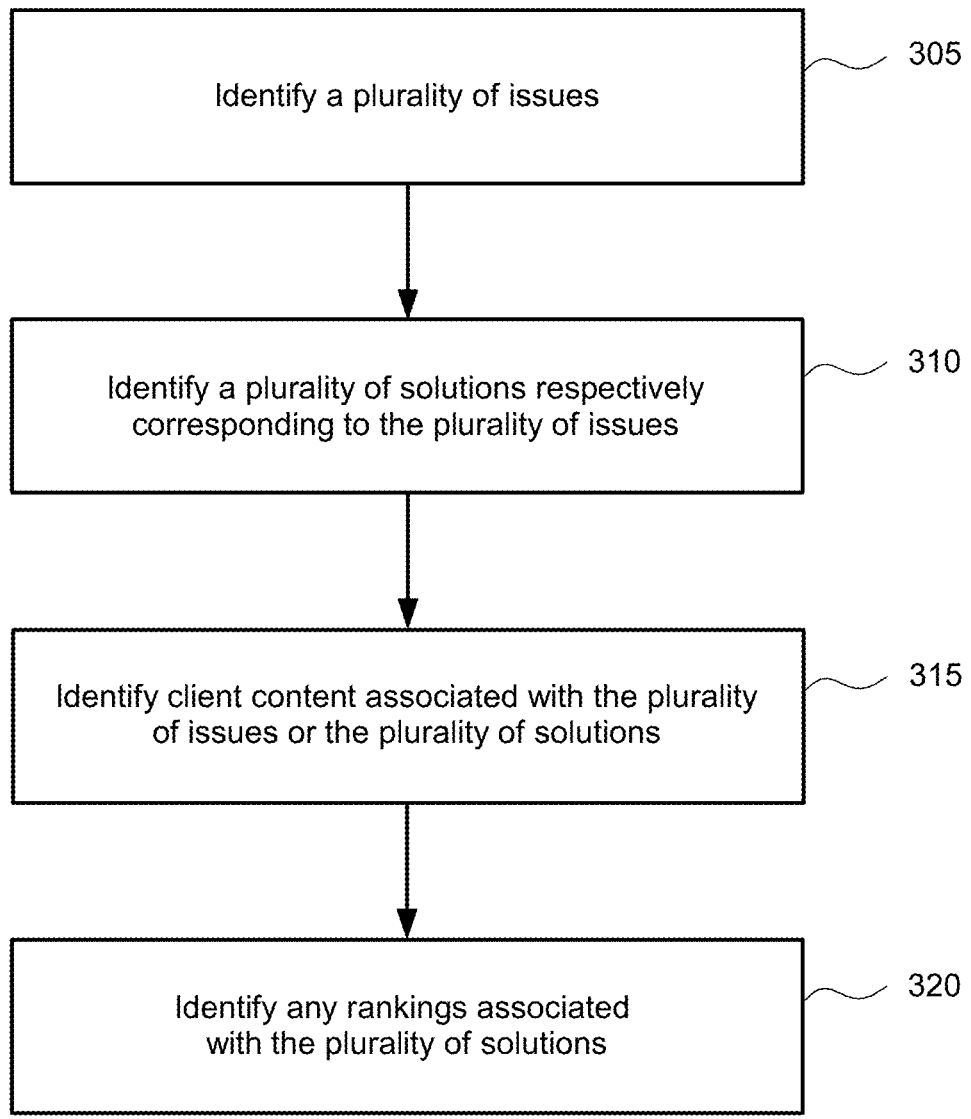
FIG. 3 illustrates a method of retrieving a corpus of information, according to an embodiment.

FIG. 3 illustrates a method 300 of retrieving the corpus of information, according to an embodiment. The method 300 provides an example embodiment with respect to step 205 of the method 200. The method 300 may begin at step 305, where the model advisor may identify a plurality of issues. The plurality of issues may include problems to be resolved and/or tasks to be completed. One or more of the plurality of issues may be based upon client concerns. The model advisor may identify the plurality of issues by consulting the client data repository and/or the incidents/modifications repository among the set of repositories. At step 310, the model advisor may identify a plurality of solutions respectively corresponding to the plurality of issues, e.g., respectively addressing the plurality of issues. The model advisor may identify the plurality of solutions by consulting the knowledge base repository among the set of repositories. At step 315, the model advisor may identify client content associated with the plurality of issues or the plurality of solutions. Such client content may include textual or audiovisual content, client interaction logs, and/or client comments associated with the plurality of issues and/or associated with the plurality of solutions. The model advisor may identify such client content by consulting the client data repository and/or the log repository among the set of repositories. At step 320, the model advisor may identify any rankings associated with the plurality of solutions. Such rankings may include client-provided rankings, statistically based rankings, and/or rankings from external sources, such as rankings from social media. The model advisor may assess such rankings upon configuring or selecting model service(s) which obtain data from the corpus of information. While the model advisor may identify aspects according to the method 300 by consulting the specific repositories listed above, the model advisor may consult any combination of the repositories among the set of repositories in order to identify various aspects at steps 305-320. Furthermore, the steps of the method 300 may be associated with both records among the set of repositories and external data. In the context of identifying various aspects at steps 305-320, the model advisor may consult external sources, which may provide social networking data pertaining to social channel rankings, likes, etc.

Figure 4:
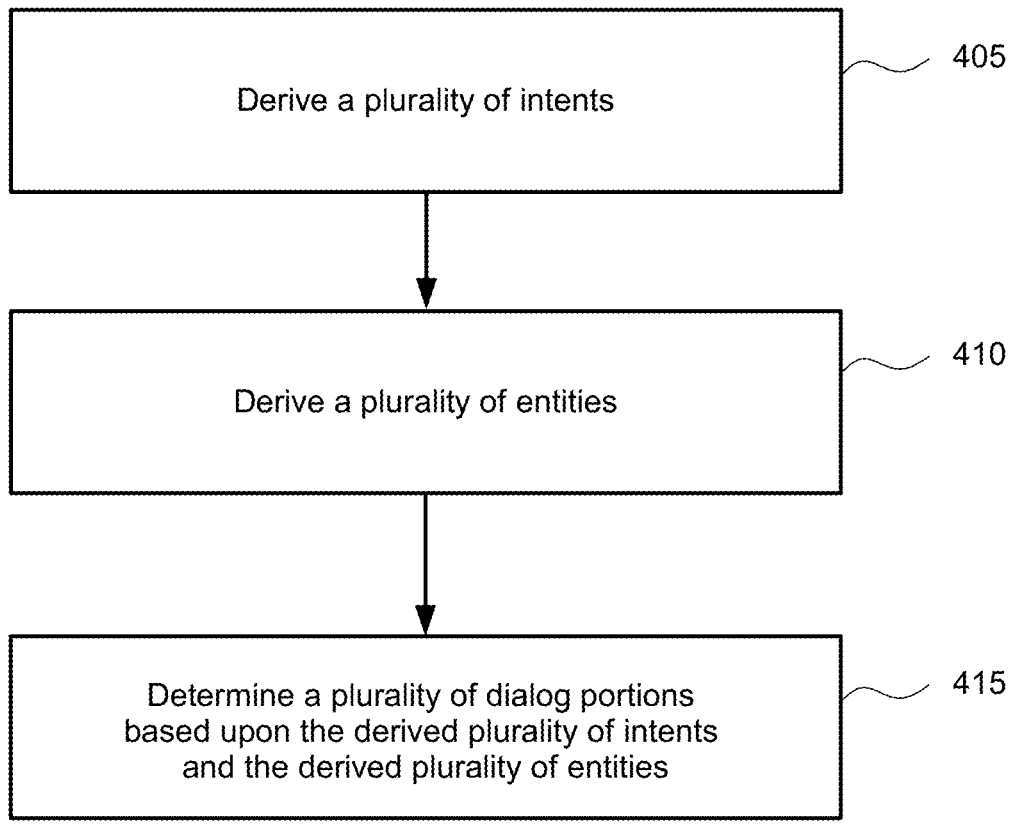
FIG. 4 illustrates a method of configuring a conversational agent learning model, according to an embodiment.

FIG. 4 illustrates a method 400 of configuring the conversational agent learning model, according to an embodiment. The method 400 provides an example embodiment with respect to step 210 of the method 200. The method 400 may begin at step 405, where the model advisor may derive a plurality of intents based upon the plurality of issues, wherein each of the plurality of intents indicates a purpose or a goal. For example, an intent derived by the model advisor among the plurality of intents may be bill payment. At step 410, the model advisor may derive a plurality of entities. Each of the plurality of entities may be an object class or a data type that enables selection of at least one action based upon the plurality of solutions in order to address one or more of the plurality of intents. According to the payment example, the model advisor may derive the bill as an entity from the derived bill payment intent. Deriving the bill as an entity in turn may enable the model advisor to select at least one action upon the derived bill in order to address the derived bill payment intent, e.g., processing client payment of the bill. At step 415, the model advisor may determine a plurality of dialog portions. The model advisor may determine the plurality of dialog portions based upon the plurality of intents derived at step 405 and based upon the plurality of entities derived at step 410. Each of the plurality of dialog portions may include conversational text to address one or more of the plurality of intents consequent to applying the at least one action to one or more of the plurality of entities. The model advisor may determine dialog portions based upon consulting a conversation history of one or more of the plurality of clients. Additionally or alternatively, the model advisor may determine dialog portions based upon social channel interactions (e.g., social networking activity) of one or more of the plurality of clients. The model advisor may access such conversation history and/or social channel interactions via the client data repository and/or via the log repository. According to the payment example, the model advisor may determine one or more dialog portions consequent to applying one or more bill payment processing actions upon the derived bill to address the derived bill payment intent. Such one or more dialog portions may be presented to one or more of the plurality of clients in the context of the interaction between the conversational agent learning model and the plurality of clients. An example dialog portion determined consequent to applying one or more bill payment processing actions may include: "Your bill has been processed". Furthermore, the one or more dialog portions determined by the model advisor further may involve provision of information regarding the derived entity. According to the payment example, the model advisor may provide a dialog portion including information regarding the bill, for instance: "The top portion of the bill reveals a payment balance of $50.00".

In an embodiment, at optional step 230 of the method 200, the model advisor may update the conversational agent learning model to address the at least one deficiency identified at optional step 225 by incorporating at least one new intent into the plurality of intents derived at step 405 or by incorporating at least one new entity into the plurality of entities derived at step 410. By incorporating at least one new intent and/or at least one new entity according to the embodiment, the model advisor may account for any previously unaddressed or under-addressed category in the context of the interaction between the conversational agent learning model and the plurality of clients. Furthermore, according to the embodiment, the model advisor may address the at least one deficiency by incorporating at least one new dialog portion into the plurality of dialog portions determined at step 415. The at least one new dialog portion may include conversational text to address one or more of the at least one new intent. Furthermore, such conversational text may reflect application of one or more actions to one or more of the at least one new entity. Such incorporations may be dynamic and autonomous (i.e., updated without intervention of a domain administrator) in accordance with the model policies. For instance, the model advisor may identify new intents and/or entities as interaction between a client and the conversational agent learning model progresses and may process and apply one or more actions to the newly identified intents and/or entities. Furthermore, the model advisor may complete such incorporations consequent to identifying potential new model aspects via interaction with both structured channels (e.g., formal records) and unstructured channels (e.g., social media data). Furthermore, in addition to incorporating at least one new intent, at least one new entity, and/or at least one new dialog portion, the model advisor may dynamically and autonomously update already existing aspects of the conversational agent learning model in accordance with the model policies. Thus, the model advisor may "retrofit" the conversational agent learning model. While the model advisor may add or update aspects of the conversational agent learning model autonomously, a domain administrator may intervene to supervise and, if necessary, refine such additions or updates.

Figure 5:
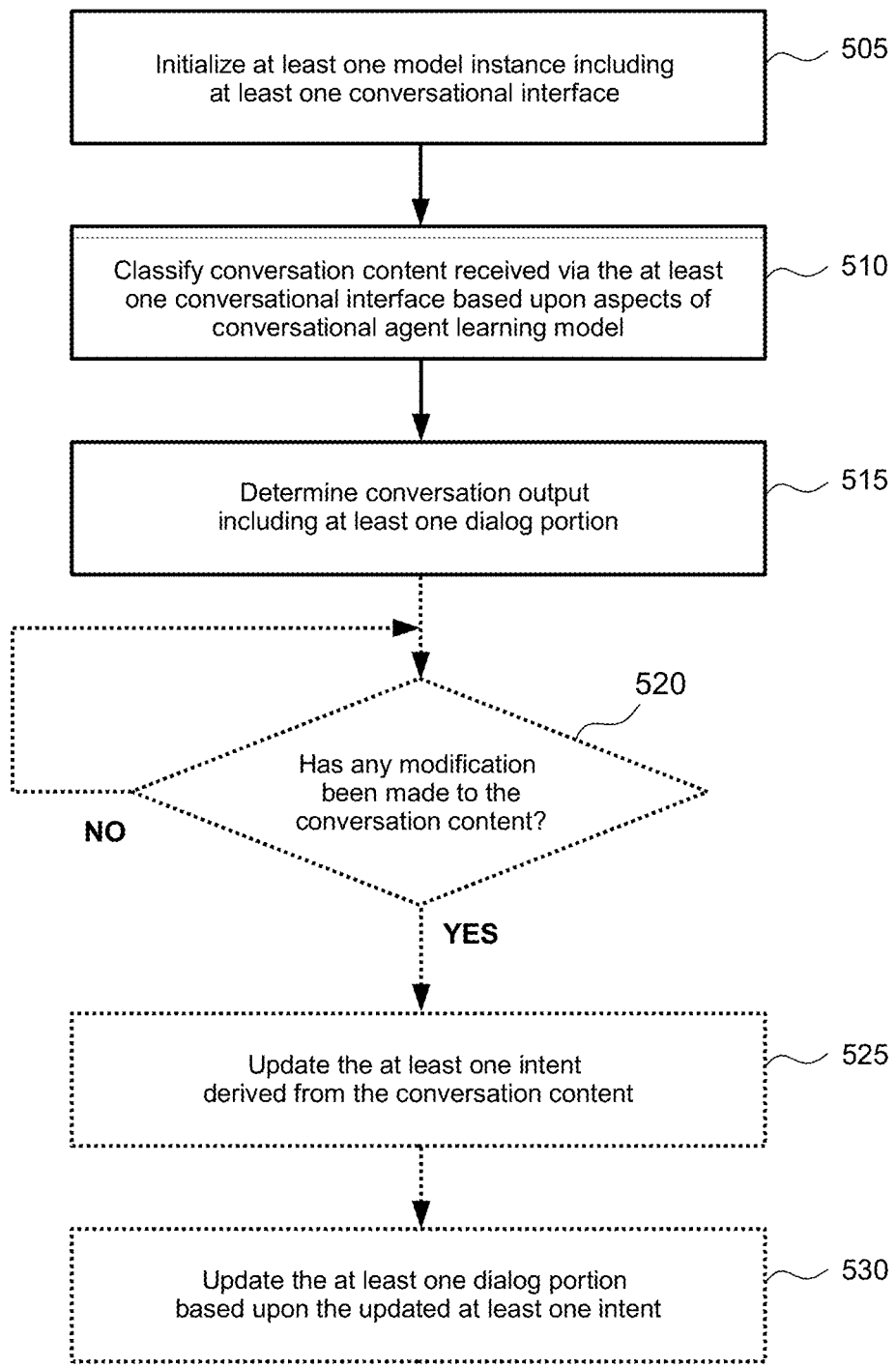
FIG. 5 illustrates a method of deploying a conversational agent learning model, according to an embodiment.

FIG. 5 illustrates a method 500 of deploying the conversational agent learning model, according to an embodiment. The method 500 provides an example embodiment with respect to step 215 of the method 200. The method 500 may begin at step 505, where the model advisor may initialize at least one model instance (e.g., model instance 123), wherein the at least one model instance includes at least one conversational interface accessible to at least one of the plurality of clients. The at least one model instance may include a chatbot instance and/or an alternative form of bot instance. The model advisor may initialize the at least one model instance in response to one or more service requests (e.g., one or more queries) received from one or more of the plurality of clients. At step 510, based upon aspects of the conversational agent learning model, the model advisor may classify conversation content received from one or more of the plurality of clients via the at least one conversational interface. Conversation content may include any conversation input or any other input received from one or more of the plurality of clients. Classifying the conversation content may entail classifying at least one intent derived from the conversation content by the model advisor. Classifying the conversation content further may entail classifying at least one entity derived from the conversation content by the model advisor. The model advisor may consider client-specific information in the context of classifying conversation content. Specifically, in the context of interaction between a client among the plurality of clients and the conversational agent learning model, the model advisor may access profile data associated with the client. The model advisor may access such profile data from the client data repository and/or from external sources, e.g., which may provide social networking data associated with the client. By accessing such profile data, the model advisor may be more capable of accurately deriving intents and/or entities from the conservation content involving the client, as the profile data may enable the model advisor to detect client preferences. An embodiment with regard to classifying the conversation content according to step 510 is described with respect to FIG. 6. A further embodiment with regard to classifying the conversation content according to step 510 is described with respect to FIG. 7.

At step 515, based upon the classification of the conversation content, the model advisor may determine conversation output including at least one dialog portion among the plurality of dialog portions determined at step 415. The model advisor may facilitate presentation of the conversation output to one or more of the plurality of clients via the at least one conversational interface included in the at least one model instance. The model advisor may consider client-specific information in the context of determining conversation output. By accessing profile data associated with a client, the model advisor may be more capable of determining one or more dialog portions appropriate for such client. For instance, by determining based upon profile data that Client C is relatively young and works in a particular field, the model advisor may ensure that the conversation output directed to Client C is appropriate in light of his or her age and profession.

Optionally, at step 520, the model advisor may determine whether any addition has been made to the conversation content. Specifically, such addition may include a new alternative or dynamic added to an intent based upon a request of a client among the plurality of clients. Upon determining at step 520 that no addition has been made to the conversation content, the model advisor may repeat step 520. In an alternative embodiment, upon determining at step 520 that no addition has been made to the conversation content, the method 500 may end. Upon determining at step 520 that at least one modification has been made to the conversation content (e.g., an addition, a correction, and/or a deletion), the method 500 may proceed to step 525, where the model advisor may update the at least one intent derived from the conversation content based upon the at least one modification. Based upon the updated at least one intent, at step 530 the model advisor may update the at least one dialog portion determined as part of the conversation output at step 515. The model advisor may update the at least one dialog portion at step 530 by determining one or more other dialog portions among the plurality of dialog portions determined at step 415 and/or by determining one or more new dialog portions. Steps 520 and 525 may enable the model advisor to dynamically adjust the at least one dialog portion included in the conversation output based upon an update to the at least one intent derived from the conversation content. Specifically, when the model advisor derives an intent from the conversation content, the model advisor may determine a dialog portion to address the intent, but when a new alternative or dynamic is added to the intent or when the intent is otherwise modified consequent to a modification to conversation content, the model advisor may determine a corresponding change to the originally determined dialog portion. Accordingly, the model advisor may address modifications to conversation content dynamically via "cognitive inference". According to an embodiment, at step 525 the model advisor further may update the at least one entity derived from the conversation content.

In an embodiment, the conversation output determined at step 515 may include conversational text to address the at least one intent derived from the conversation content by applying at least one action to the at least one entity derived from the conversation content. Such conversational text may pertain directly to the at least one intent derived from the conversation content. Additionally or alternatively, such conversational text may address one or more peripheral concerns of one or more of the plurality of clients interacting with the at least one model instance. In a further embodiment, the conversation output determined at step 515 may include unstructured dialog. Such unstructured dialog may include unstructured text and/or audiovisual content. Additionally or alternatively, such unstructured dialog may include one or more ideograms (e.g., emoji) or emoticons. Additionally or alternatively, such unstructured dialog may include "rich dialog", which may be defined as dialog based upon an extended array of content types. Such "rich dialog" may include all unstructured content or alternatively may include a combination of structured content and unstructured content. According to such embodiment, the model advisor may determine the at least one dialog portion included in the conversation output at step 515 by classifying unstructured dialog and incorporating the unstructured dialog into the at least one dialog portion. Accordingly, the model advisor may facilitate presentation of the at least one dialog portion including unstructured dialog to one or more of the plurality of clients via the at least one conversational interface included in the at least one model instance.

Figure 6:
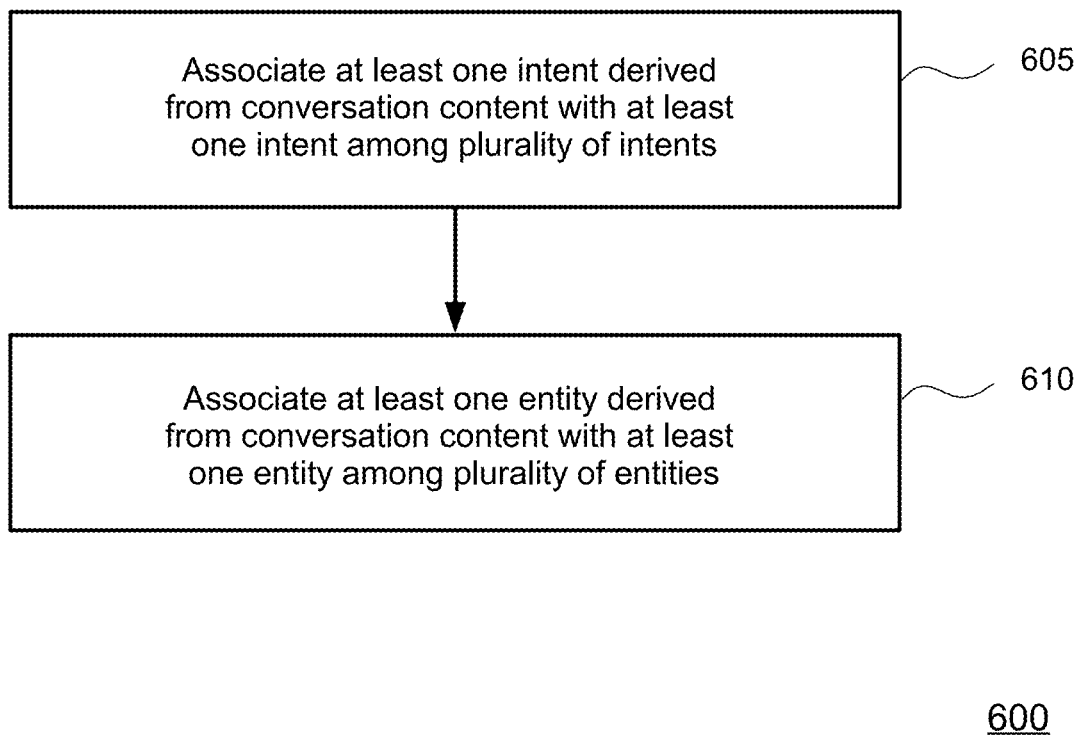
FIG. 6 illustrates a method of classifying conversation content, according to an embodiment.

FIG. 6 illustrates a method 600 of classifying the conversation content, according to an embodiment. The method 600 provides an example embodiment with respect to step 510 of the method 500. The method 600 may begin at step 605, where the model advisor may associate the at least one intent derived from the conversation content with at least one intent among the plurality of intents derived at step 405 in the context of configuring the conversational agent learning model. In an embodiment, the model advisor may make such association consequent to a comparison (e.g., an iterative comparison) of the at least one intent derived from the conversation content with the respective intents among the plurality of intents derived during configuration of the conversational agent learning model. The model advisor may complete such comparison through application of string matching (e.g., via a string matching algorithm) and/or natural language processing. At step 610, the model advisor may associate the at least one entity derived from the conversation content with at least one entity among the plurality of entities derived at step 410 in the context of configuring the conversational agent learning model. In an embodiment, the model advisor may make such association consequent to a comparison (e.g., an iterative comparison) of the at least one entity derived from the conversation content with the respective entities among the plurality of entities derived during configuration of the conversational agent learning model. The model advisor may complete such comparison through application of string matching (e.g., via a string matching algorithm) and/or natural language processing. Additionally or alternatively, the model advisor may apply other classification methods or algorithms in the context of steps 605 and 610 in order to classify the at least one intent and/or the at least one entity derived from the conversation content.

Figure 7:
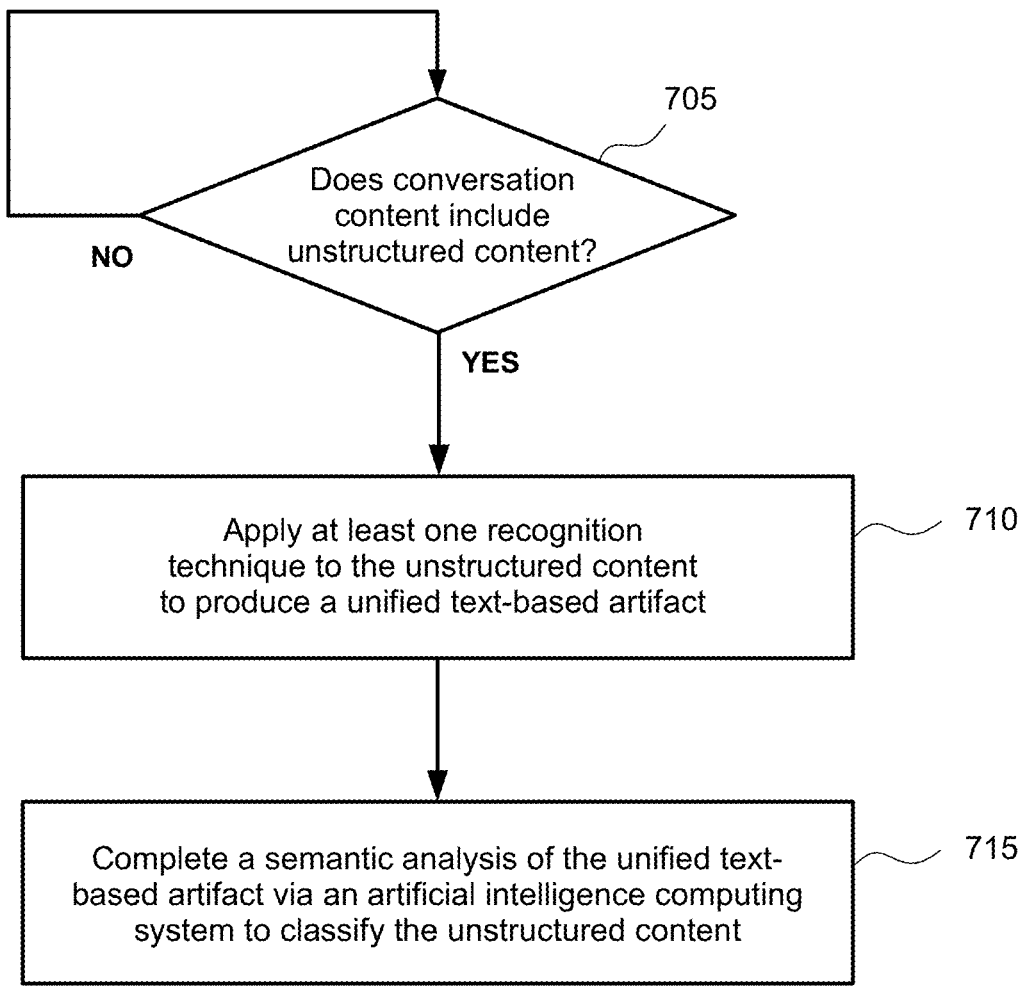
FIG. 7 illustrates a method of classifying conversation content, according to a further embodiment.

FIG. 7 illustrates a method 700 of classifying the conversation content, according to an embodiment. The method 700 provides a further example embodiment with respect to step 510 of the method 500. The method 700 may begin at step 705, where the model advisor may determine whether the conversation content received via the at least one conversational interface from one or more of the plurality of clients includes unstructured content. Unstructured content in the context of the method 700 may include unstructured documents or forms. Unstructured content in the context of the method 700 further may include audiovisual content such as speech, images, and/or video. Unstructured content in the context of the method 700 further may include one or more ideograms (e.g., emoji) or emoticons. Upon determining at step 705 that the conversation content does not include unstructured content, the model advisor may repeat step 705. In an alternative embodiment, upon determining at step 705 that the conversation content does not include unstructured content, the method 700 may end. Upon determining that the conversation content includes unstructured content, the method 700 may proceed to step 710, where the model advisor may apply at least one recognition technique to the unstructured content to produce a unified text-based artifact (i.e., meta-content). Such at least one recognition technique may include one or more techniques selected from the group consisting of optical character recognition (OCR), optical mark recognition (OMR), intelligent character recognition (ICR), image recognition, speech-to-text, and video-to-text. At step 715, the model advisor may complete a semantic analysis of the unified text-based artifact via an artificial intelligence computing system to classify the unstructured content. The semantic analysis may result in determination of one or more new topics or other aspects via which to classify one or more aspects of the unified text-based artifact. Based upon the classification of the unstructured content consequent to analysis of the text-based artifact, the model advisor may create conversation output to address the unstructured content.

For instance, upon receiving conservation content from Client D in the form of a check graphic via a conversational interface accessible to Client D, the model advisor may determine according to step 705 that the conversation content from Client D includes unstructured content. Subsequently, the model advisor may apply image recognition according to step 710 to determine a unified text-based artifact based upon bill payment. The model advisor may complete a semantic analysis with respect to the text-based artifact related to bill payment to classify the check graphic by associating it with a bill payment intent. Accordingly, the model advisor may create conversation output in the form of a dialog portion to be presented via the conversational interface accessible to Client D, requesting that Client D confirm an intention to process a bill payment.

Figure 8:
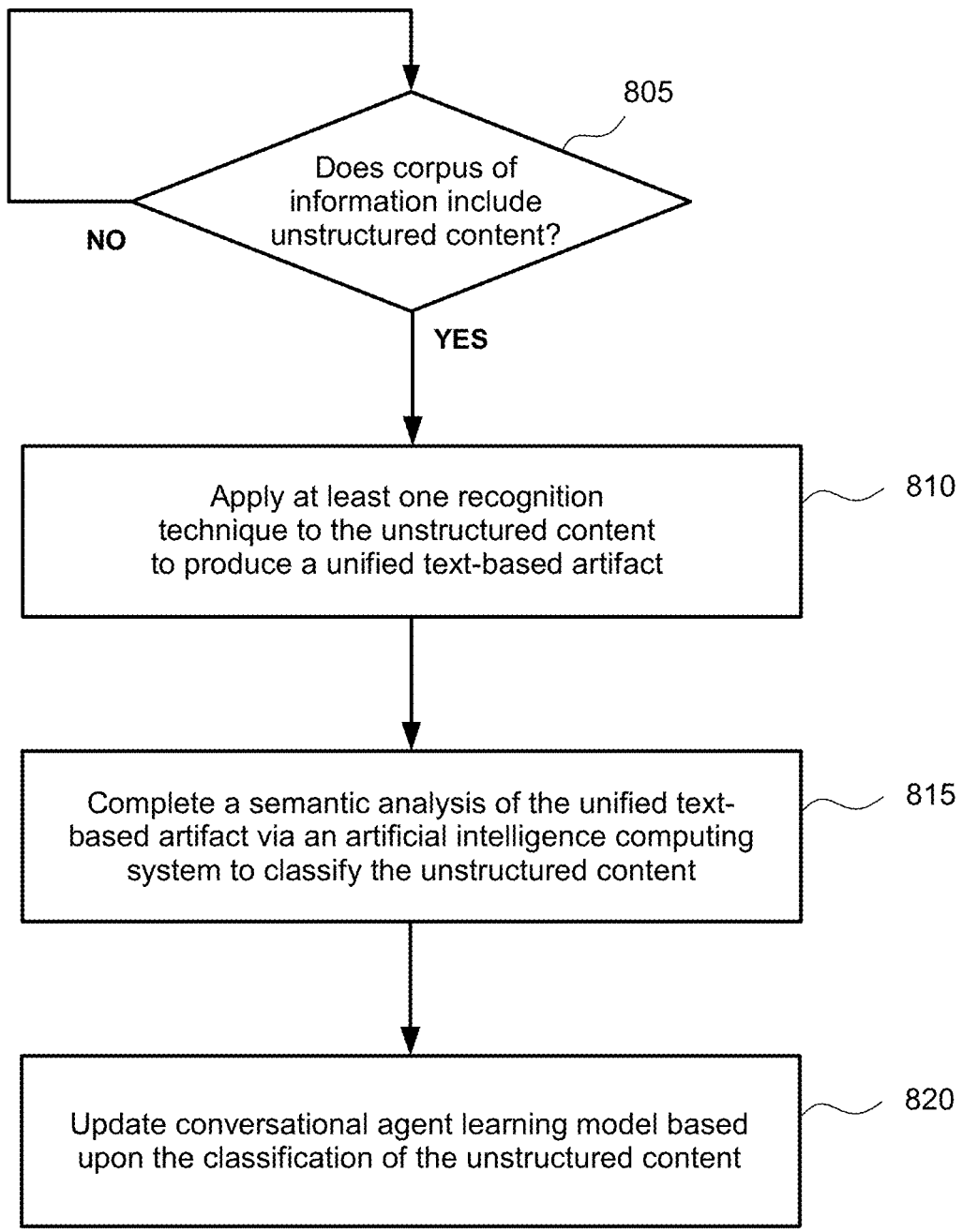
FIG. 8 illustrates a method of configuring a conversational agent learning model, according to a further embodiment.

FIG. 8 illustrates a method 800 of configuring the conversational agent learning model, according to an embodiment. The method 800 provides a further example embodiment with respect to step 210 of the method 200. The method 800 may begin at step 805, where the model advisor may determine whether the corpus of information includes unstructured content. Unstructured content in the context of the method 800 may include unstructured documents or forms. Unstructured content in the context of the method 800 further may include audiovisual content such as speech, images, and/or video. Unstructured content in the context of the method 800 further may include one or more ideograms (e.g., emoji) or emoticons. Unstructured content in the context of the method 800 further may include social media response content (e.g., content incorporating "likes", "dislikes", etc.). Upon determining at step 805 that the corpus of information does not include unstructured content, the model advisor may repeat step 805. In an alternative embodiment, upon determining at step 805 that the corpus of information does not include unstructured content, the method 800 may end. Upon determining that the corpus of information includes unstructured content, the method 800 may proceed to step 810, where the model advisor may apply at least one recognition technique to the unstructured content to produce a unified text-based artifact (i.e., meta-content). Such at least one recognition technique may include one or more techniques selected from the group consisting of optical character recognition (OCR), optical mark recognition (OMR), intelligent character recognition (ICR), image recognition, speech-to-text, and video-to-text. At step 815, the model advisor may complete a semantic analysis of the unified text-based artifact via an artificial intelligence computing system to classify the unstructured content. The semantic analysis may result in determination of one or more new topics or other aspects via which to classify one or more aspects of the unified text-based artifact. At step 820, the model advisor may update the conversational agent learning model based upon the classification of the unstructured content. Specifically, at step 820 the model advisor may add new topics or other aspects to the conversational agent learning model based upon the semantic analysis completed at step 815 and may classify the unstructured content in the context of the new topics or other aspects. Additionally or alternatively, at step 820 the model advisor may update existing topics or other aspects of the conversational agent learning model based upon the semantic analysis completed at step 815 and may classify the unstructured content in the context of the newly updated topics or other aspects. By updating the conversational agent learning model according to step 820, the model advisor may adapt the model to ensure compatibility with one or more types of unstructured content.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of dynamically constructing a conversational agent learning model, the method comprising:
    retrieving a corpus of information, wherein the corpus of information includes records from a set of repositories and external data, including data from social networks or applications;
    configuring the conversational agent learning model based upon the retrieved corpus of information, wherein configuring the conversational agent learning model comprises adding new model topics based upon completing a semantic analysis via an artificial intelligence computing system to classify unstructured content;
    deploying the conversational agent learning model by facilitating interaction between the conversational agent learning model and a plurality of clients; and
    updating the conversational agent learning model to address at least one modification to the corpus of information by adjusting dialog portion aspects to address questions regarding new technology or by adjusting dialog portion aspects to facilitate payment via the new technology.

2. The method of claim 1, further comprising:
    based upon information received consequent to the interaction, identifying at least one deficiency in the conversational agent learning model; and
    updating the conversational agent learning model to address the at least one deficiency.

3. The method of claim 1, further comprising:
    receiving input from a domain administrator, wherein the domain administrator adds or updates categories associated with the conversational agent learning model or facilitates access to new sources in order to populate the conversational agent learning model.

4. The method of claim 1, wherein updating the conversational agent learning model to address the at least one modification to the corpus of information further comprises dynamically adjusting at least one aspect of the conversational agent learning model based upon new social trends.

5. The method of claim 1, wherein retrieving the corpus of information comprises:
    identifying a plurality of issues;
    identifying a plurality of solutions respectively corresponding to the plurality of issues;
    identifying client content associated with the plurality of issues or the plurality of solutions; and
    identifying rankings associated with the plurality of solutions.

6. The method of claim 5, wherein configuring the conversational agent learning model comprises:
    deriving a plurality of intents based upon the plurality of issues, wherein each of the plurality of intents indicates a purpose or a goal;
    deriving a plurality of entities, wherein each of the plurality of entities is an object class or a data type that enables selection of at least one action based upon the plurality of solutions in order to address one or more of the plurality of intents; and
    determining a plurality of dialog portions, wherein each of the plurality of dialog portions includes conversational text to address one or more of the plurality of intents consequent to applying the at least one action to one or more of the plurality of entities.

7. The method of claim 6, wherein deploying the conversational agent learning model comprises:
    initializing at least one model instance, wherein the at least one model instance includes at least one conversational interface accessible to at least one of the plurality of clients;
    classifying conversation content received via the at least one conversational interface, including at least one intent derived from the conversation content and at least one entity derived from the conversation content, based upon aspects of the conversational agent learning model; and
    determining conversation output including at least one dialog portion among the plurality of dialog portions based upon the classification of the conversation content.

8. The method of claim 7, wherein the conversation output includes conversational text to address the at least one intent derived from the conversation content by applying at least one action to the at least one entity derived from the conversation content.

9. The method of claim 6, wherein dialog portions among the plurality of dialog portions are determined based upon a conversation history or social channel interactions of one or more of the plurality of clients.

10. The method of claim 5, wherein the rankings associated with the plurality of solutions include social media rankings.

11. The method of claim 1, wherein updating the conversational agent learning model to address the at least one modification to the corpus of information further comprises adjusting the dialog portion aspects to reflect at least one trend manifested in social networks or social applications, wherein the at least one trend is consistent with an identified client characteristic.

12. The method of claim 11, wherein the identified client characteristic is associated with age.

13. A computer program product comprising a computer readable storage medium having program instructions embodied therewith for dynamically constructing a conversational agent learning model, the program instructions executable by a computing device to cause the computing device to:
    retrieve a corpus of information, wherein the corpus of information includes records from a set of repositories and external data, including data from social networks or applications;
    configure the conversational agent learning model based upon the retrieved corpus of information, wherein configuring the conversational agent learning model comprises adding new model topics based upon completing a semantic analysis via an artificial intelligence computing system to classify unstructured content;
    deploy the conversational agent learning model by facilitating interaction between the conversational agent learning model and a plurality of clients; and
    update the conversational agent learning model to address at least one modification to the corpus of information by adjusting dialog portion aspects to address questions regarding new technology or by adjusting dialog portion aspects to facilitate payment via the new technology.

14. The computer program product of claim 13, wherein the program instructions further cause the computing device to:
    receive input from a domain administrator, wherein the domain administrator adds or updates categories associated with the conversational agent learning model or facilitates access to new sources in order to populate the conversational agent learning model.

15. The computer program product of claim 13, wherein retrieving the corpus of information comprises:
    identifying a plurality of issues;
    identifying a plurality of solutions respectively corresponding to the plurality of issues;
    identifying client content associated with the plurality of issues or the plurality of solutions; and
    identifying rankings associated with the plurality of solutions, wherein the rankings include client-provided rankings or social media rankings.

16. The computer program product of claim 15, wherein configuring the conversational agent learning model comprises:
    deriving a plurality of intents based upon the plurality of issues, wherein each of the plurality of intents indicates a purpose or a goal;
    deriving a plurality of entities, wherein each of the plurality of entities is an object class or a data type that enables selection of at least one action based upon the plurality of solutions in order to address one or more of the plurality of intents; and
    determining a plurality of dialog portions, wherein each of the plurality of dialog portions includes conversational text to address one or more of the plurality of intents consequent to applying the at least one action to one or more of the plurality of entities.

17. The computer program product of claim 13, wherein updating the conversational agent learning model to address the at least one modification to the corpus of information further comprises adjusting the dialog portion aspects to reflect at least one trend manifested in social networks or social applications, wherein the at least one trend is consistent with an identified client characteristic.

18. The computer program product of claim 17, wherein the identified client characteristic is associated with age.

19. The computer program product of claim 13, wherein the program instructions further cause the computing device to:
    based upon information received consequent to the interaction, identify at least one deficiency in the conversational agent learning model; and
    update the conversational agent learning model to address the at least one deficiency.

20. A system comprising:
    a processor; and
    a memory storing an application program, which, when executed on the processor, performs an operation of dynamically constructing a conversational agent learning model, the operation comprising:
        retrieving a corpus of information, wherein the corpus of information includes records from a set of repositories and external data, including data from social networks or applications;
        configuring the conversational agent learning model based upon the retrieved corpus of information, wherein configuring the conversational agent learning model comprises adding new model topics based upon completing a semantic analysis via an artificial intelligence computing system to classify unstructured content;
        deploying the conversational agent learning model by facilitating interaction between the conversational agent learning model and a plurality of clients; and
        updating the conversational agent learning model to address at least one modification to the corpus of information by adjusting dialog portion aspects to address questions regarding new technology or by adjusting dialog portion aspects to facilitate payment via the new technology.

21. The system of claim 20, wherein the operation further comprises:
    receiving input from a domain administrator, wherein the domain administrator adds or updates categories associated with the conversational agent learning model or facilitates access to new sources in order to populate the conversational agent learning model.

22. The system of claim 20, wherein retrieving the corpus of information comprises:
    identifying a plurality of issues;
    identifying a plurality of solutions respectively corresponding to the plurality of issues;
    identifying client content associated with the plurality of issues or the plurality of solutions; and
    identifying rankings associated with the plurality of solutions, wherein the rankings include client-provided rankings or social media rankings.

23. The system of claim 22, wherein configuring the conversational agent learning model comprises:
    deriving a plurality of intents based upon the plurality of issues, wherein each of the plurality of intents indicates a purpose or a goal;
    deriving a plurality of entities, wherein each of the plurality of entities is an object class or a data type that enables selection of at least one action based upon the plurality of solutions in order to address one or more of the plurality of intents; and
    determining a plurality of dialog portions, wherein each of the plurality of dialog portions includes conversational text to address one or more of the plurality of intents consequent to applying the at least one action to one or more of the plurality of entities.

24. The system of claim 20, wherein updating the conversational agent learning model to address the at least one modification to the corpus of information further comprises adjusting the dialog portion aspects to reflect at least one trend manifested in social networks or social applications, wherein the at least one trend is consistent with an identified client characteristic.

25. The system of claim 20, wherein the operation further comprises:
    based upon information received consequent to the interaction, identifying at least one deficiency in the conversational agent learning model; and
    updating the conversational agent learning model to address the at least one deficiency.

* * * * *